United States Patent [19]

Welna

[11] Patent Number: 5,476,891

[45] Date of Patent: Dec. 19, 1995

[54] INTUMESCENT COMPOSITION EXHIBITING IMPROVED LONG-TERM EXPANSION AND COMPRESSION PROPERTIES AND METHOD OF USE

[75] Inventor: Walton W. Welna, Woodbury, Minn.

[73] Assignee: Minnesota Mining and Manufacturing Company, St. Paul, Minn.

[21] Appl. No.: 288,985

[22] Filed: Aug. 11, 1994

Related U.S. Application Data

[63] Continuation of Ser. No. 49,519, Apr. 19, 1993, abandoned.

[51] Int. Cl.[6] .................................................. C08K 5/18
[52] U.S. Cl. ........................ 524/252; 524/254; 524/255; 523/179
[58] Field of Search ........................... 523/179; 524/252, 524/254, 255

[56] References Cited

U.S. PATENT DOCUMENTS

| | | | |
|---|---|---|---|
| 3,669,299 | 6/1972 | Jones et al. | 220/10 |
| 4,018,962 | 4/1977 | Pedlow | 428/245 |
| 4,061,344 | 12/1977 | Bradley et al. | 277/26 |
| 4,218,502 | 8/1980 | Graham et al. | 428/144 |
| 4,234,639 | 11/1980 | Graham | 428/144 |
| 4,273,879 | 6/1981 | Langer et al. | 521/91 |
| 4,364,210 | 12/1982 | Fleming et al. | 52/221 |
| 4,433,732 | 2/1984 | Licht et al. | 169/48 |
| 4,467,577 | 8/1984 | Licht | 52/232 |
| 4,521,333 | 6/1985 | Graham et al. | 252/606 |
| 4,588,523 | 5/1986 | Tashlick et al. | 252/606 |
| 4,663,226 | 5/1987 | Vajs et al. | 428/305.5 |
| 4,902,775 | 2/1990 | Colvin et al. | 528/389 |
| 4,952,615 | 8/1990 | Welna | 523/179 |
| 5,093,388 | 3/1992 | Sieman, Jr. et al. | 523/149 |

FOREIGN PATENT DOCUMENTS

| | | | |
|---|---|---|---|
| 1116797 | 1/1982 | Canada | C09K 3/28 |
| 0346001A2 | of 0000 | European Pat. Off. . | |
| 0295496A2 | 12/1988 | European Pat. Off. | C09K 21/14 |
| 2390399 | 5/1978 | France | C04B 19/04 |
| 3230718A1 | 3/1983 | Germany | C07C 87/58 |

OTHER PUBLICATIONS

International Search Report from counterpart application PCT/US94/01747.
Article: Intumescent Coating Systems, Their Development and Chemistry from *J. Fire & Flammability*, vol. 1 (Apr., 1971) pp. 97–141.
Article: Methods For The Fire Protection Of Plastics And Coatings By Flame Retardant And Intumescent Systems from *Progress in Organic Coarings*, 11 (1983) pp. 41–69.
**The U.S. equivalent to this cite was provided in the parent case U.S. Pat. No. 4,273,879.
"Wingstay® 100 AZ" product literature from Goodyear, publication date unknown.
"Wingstay 100 AZ" date sheet.

*Primary Examiner*—Edward Cain
*Attorney, Agent, or Firm*—Gary L. Griswold; Walter N. Kirn; Daniel R. Pastirik

[57] ABSTRACT

A flexible, fire-retardant, intumescent composition comprising:

a) an intumescent material;

b) an effective amount of a stabilizing agent; and c) an organic binder throughout which the intumescent material and stabilizing agent are dispersed, the elastomeric binder being at least partially crosslinked, wherein the stabilizing agent consists essentially of a compound selected from the group consisting of compounds within general formula I

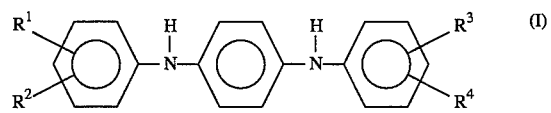

wherein $R^1$–$R^4$ inclusive are independently selected from the group consisting of hydrogen and alkyl groups having from 1 to about 5 carbon atoms, with the provisos that:

i) either both of $R^1$ and $R^2$, or both $R^3$ and $R^4$ are alkyl groups having from 1 to about 5 carbon atoms; and ii) the stabilizing agent has a melting point ranging from about 105° C. to about 125° C.
The stabilizing agent is present in an amount sufficient to render the composite expansion and compression set properties of the composition after prolonged exposure to oxidative conditions substantially unchanged.

19 Claims, No Drawings

INTUMESCENT COMPOSITION EXHIBITING IMPROVED LONG-TERM EXPANSION AND COMPRESSION PROPERTIES AND METHOD OF USE

This is a continuation of application Ser. No. 08/049,519 filed Apr. 19, 1993 now abandoned.

BACKGROUND OF THE INVENTION

1. Field of the Invention

This invention relates to flexible intumescent compositions suitable for use as firestops in deterring the spread of fire, smoke, and fumes as may happen during a fire in a building.

2. Related Art

Fire, smoke, and fumes in confined spaces, such as multi-floor buildings, can be extremely life threatening. Frequently, if fire originates in the space between a floor and ceiling of such a structure, the fire, and resultant smoke and fumes, will tend to spread to other open spaces in the building, especially to open spaces above the point of origin of the fire.

The spaces between conduits, piping, and the like, and the floors and ceilings through which they pass are known as "through-penetrations." If not protected by fire resistant materials, a through-penetration offers an area of low resistance to fire, smoke and fumes, and in essence may serve as a chimney for heat, flame and fumes. Through penetrations may be filled with commercially available fire retardant and intumescent putties, caulks, wraps, sheets, or mats, known in the art as "firestops."

Representative firestop products are disclosed in product brochure number 98-0701-3508-6 (published 1990) from Minnesota Mining and Manufacturing Company (3M). The 3M products are currently known under the trade designations "CP 25WB" "CP 25 N/S" "CP 25 S/L" and "Firedam" (caulks); "MPP-4S" and "MPS-2" (moldable putties); and "FS-195" (wrap/strip) and "CS-195" (metal reinforced sheet). These products are variously described in assignee's U.S. Pat. Nos. 4,273,879, 4,364,210, 4,467,577, and 4,952,615. Other intumescent fire retardant materials have been used, such as those known under the trade designations "Palusol" (commercially available from BASF) and "Expantrol" (commercially available from 3M Co.), the latter being an alkali metal silicate.

These firestop products and others have been widely used for reducing or eliminating the chimney effect for through-penetrations and pass the rigorous American Society of Testing Materials (ASTM) fire endurance test (ASTM E-814) after intumescing and charring wherein the material is not easily blown out of penetrations when subjected to water hose pressure such as may be present during fire fighting. Therefore, essential characteristics of a firestop material include the ability to expand and to char, and for the charred material to have sufficient strength to withstand the test requirements.

In spite of the above compositions, there exists a need in the art for a firestop composition which retains its expansion, low compression set, and flexibility after long-term exposure to oxidative environments.

SUMMARY OF THE INVENTION

The present invention relates to flexible, intumescent (heat expanding), fire retardant compositions having the capability of expanding many times their original volume (preferably at least 8 times) when exposed to heat. The compositions may be applied in sheet or molded form and remain in their flexible unexpanded state until such time as they are subjected to temperatures on the order of 110° C. or higher, as, for example, upon exposure to fire in a burning building. When heated, the inventive compositions readily intumesce (expand) to seal gaps in through-wall or through-floor penetrations, thus providing a seal against smoke, vapors, flame, water, and steam.

The compositions of the invention have excellent compression set and expansion properties coupled with excellent char strength of the charred material. These terms are specifically defined herein.

The fire-retardant compositions of the present invention are an advance over the art because they exhibit superior aging properties (are more resistant to degradation due to ozone and oxygen) and low compression set in the unexpanded state, and superior char strength in the expanded state; further, preferred compositions employ ingredients which are believed to be less toxic than known compositions.

Thus, one aspect of the present invention is a flexible, fire-retardant, intumescent composition comprising:
a) an intumescent material;
b) an effective amount of a stabilizing agent; and
c) an organic binder throughout which the intumescent material and stabilizing agent are dispersed, the elastomeric binder being at least partially crosslinked, wherein the stabilizing agent consists essentially of compounds selected from the group consisting of compounds within general formula I

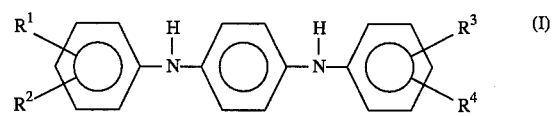

wherein $R^1$–$R^4$ inclusive are independently selected from the group consisting of hydrogen ("H") and alkyl groups having from 1 to about 5 carbon atoms, with the provisos that:
i) either both of $R^1$ and $R^2$, or both $R^3$ and $R^4$ must be alkyl groups having from 1 to about 5 carbon atoms; and
ii) the stabilizing agent has a melting point ranging from about 105° to about 125° C.

The stabilizing agent is either an antioxidant and/or an antiozonant, defined as a compound or mixture of compounds capable of reducing or preventing degradation of the organic binder due to exposure of the inventive compositions to oxygen and/or ozone. An "effective amount" of stabilizing agent means the stabilizing agent is present in an amount sufficient to render the expansion and compression set properties of the composition after prolonged exposure to oxidative conditions substantially unchanged. The term "consists essentially of," when referring to the stabilizing agent, means the stabilizing agent may contain impurities which do not render compounds within general formula I ineffective in prolonging the expansion and compression set properties.

Surprisingly, stabilizing agents useful in the present invention unexpectedly provide the intumescent compositions of the invention with a good compression set property without substantially hindering the intumescent (expansion) property. The expansion direction may be controlled by laminating the composite of the invention to a metal foil, such as aluminum foil or stainless steel foil.

Another aspect of the invention is a method of fire stopping a through-penetration, the method comprising applying the composition of the invention to a through-penetration and allowing the composition to expand and char upon exposure to heat.

Yet another aspect of the invention is a method of increasing the useful life of a flexible, fire-retardant, intumescent composition, the method comprising adding an effective amount of a stabilizing agent thereto, the stabilizing agent being described above as a mixture of two or more diaryl paraphenylenediamines within general formula I and as defined above.

Further aspects and advantages of the invention will be recognized after reading the following description and examples.

DESCRIPTION OF PREFERRED EMBODIMENTS

As used herein the term "fire-retardant" means the compositions of the invention retard the spread of flame, smoke, and/or fumes by charring under exposure to heat, and thus not degrading under the heat of fire and exposure to a water hose stream. The term "intumescent" refers to swelling or expanding under conditions of exposure to fire or heat, typically by the expulsion of water vapor. The term "chlorinated elastomeric binder" refers to a substantially crosslinked polymeric binder having a plurality of chlorine substituent groups, allowing the composition to retard fire spread. The term "char strength" is a measure of the strength of the expanded carbonaceous residue ("char") formed from the composition of the invention after exposure to temperatures above about 110° C.

The term "compression set" is defined by the equation $$\left(1 - \frac{t_f}{t_i}\right) 100$$

where $t_f/t_i$ is the ratio of composition thickness after compression and release to original composition thickness (i.e. before compression). Compression set is an indication of the degree of cure of binder in a composition of the invention. If the organic binder is not fully cured (i.e., crosslinked), compositions within the invention will deform inelastically after an applied force is released. A composition within the invention is acceptable if it has a compression set less than 20%, more preferably less than 10%, most preferably 0%, since the composition will substantially return to its original thickness after compression and release.

The term "expansion ratio" when used herein in reference to the inventive intumescent compositions is the ratio of the expanded volume (caused by heating or exposure to heat) to initial volume of a sample of the composition of the invention under standard heating conditions.

It was found that the degree of cure of the organic binder affected the expansion ratio of compositions within the invention. Compositions which were undercured apparently provided no resistance to the expansion gases from the intumescent component and allowed the expansion gases to escape. On the other hand, binders which were overcured apparently provided excessive resistance to the expansion gases and did not allow the expansion to take place. Control of this process is critical to the development of a composition that will perform as installed and continue to perform after it has aged.

Stabilization agents useful in the compositions of the invention consist essentially of compounds selected from the group consisting of diaryl paraphenylenediamines within general formula I, the diaryl paraphenylenediamines having melting point ranging from about 105° to about 125° C. An especially preferred stabilizing agent is commercially available from Goodyear Chemical Co., Akron, Ohio, under the trade designation "Wingstay" 100 AZ. This is a proprietary mixture of diaryl para-phenylenediamines within general formula I having a melting point ranging from 108°–114° C. The starting materials for synthesizing this particular stabilizing agent are believed to be orthotoluidine, mixed xylidenes (ortho, meta, and para), and hydroquinone. Thus, reaction products would typically comprise the di- mixed (ortho, meta, and/or para) xylidene-, diorthotolyl-, and orthotolyl- mixed (ortho, meta, or para) xylidene paraphenylenediamines. Although not wishing to be bound to any particular theory, the methyl groups (and longer chain alkyl groups, if present) on the xylidene appear to decrease the basicity of nitrogens in the reaction product, and thus apparently decreasing premature curing of the compositions within the invention.

The intumescent material is preferably a granular hydrated alkali metal silicate such as described in U.S. Pat. No. 4,273,879 (Langer et al.), incorporated herein by reference. The average particle size of the intumescent material may range from about 0.2 mm to about 2.0 mm, with about 95 weight percent of the particles being greater than 0.2 mm. The preferred alkali metal silicates described in the '879 patent are granulated sodium silicates having a moisture content of about 5 to about 30 weight percent, a silicon dioxide ($SiO_2$) to sodium oxide ($Na_2O$) ratio ranging from about 2.0:1 to about 3.75:1, and particle sizes ranging from about 0.2 mm to 2.0 mm (i.e. about 95% of the particles being greater than 0.2 mm).

In preferred compositions of the invention, the uncombined sulfur content is preferably less than 5 parts per 100 weight (PHR), more preferably less than 2.5 parts per 100 weight (PHR), even more preferably less than 1 parts per 100 weight (PHR). It has been found by the inventor that when the stabilizing agent known under the trade designation "Wingstay" 100 AZ is included in the composition of the invention, not only does the composition exhibit acceptable compression set when uncombined sulfur is zero or a de minimis amount, but the expansion of the composition is also maximized.

It has also been found that use of curing accelerators containing sulfur linkages, such as dimethylthiuram monosulfide (available under the trade designation "Unads" from Akzo Chemicals, Akron, Ohio) and diorthotolylguanidine (DOTG), provide surprisingly improved long-term retention of char expansion of material aged at elevated temperature, especially when uncombined sulfur is omitted or held to a de minimis amount.

In the rubber chemistry art, relative weights of ingredients are frequently expressed as "parts per hundred weight of elastomer", or "PHR." Examples of compositions within the invention having amounts of ingredients expressed in this manner are given in the Examples which follow. On a weight percentage basis, the flexible, intumescent, fire-retardant compositions of the invention preferably comprise from about 15 to about 80 weight percent of hydrated alkali metal silicate, from about 15 to about 40 weight percent of an organic binder, at most 40 weight percent of an organic char-forming component, and from about 0.1 to about 1.5 weight percent of diaryl paraphenylenediamines within general formula I.

The organic binder is preferably an elastomer, more preferably a chlorinated elastomer such as the polychloroprene elastomers known under the trade designation "Neoprene" and the like. Elastomeric binders are preferably selected from a class of organic charforming elastomers such as natural rubber and synthetic rubbers such as polyisoprene and polychloroprene rubbers. An especially preferred elastomer is polychloroprene because it has excellent aging properties, good weatherability and by itself is a char former when exposed to fire or heat.

As polychloroprene elastomers and like elastomers are char-forming by nature, it is not necessary to use a char-forming binder additive. Both "Neoprene G and "Neoprene W" type chloroprene rubbers are useful in the invention as organic binders. "Neoprene G" rubber differs from "Neoprene W" Types in that the G types are interpolymerized with sulfur and contain a thiuram disulfide stabilizer. The W types are homopolymers of chloroprene or copolymers of chloroprene and 2,3-dichloro-1,3-butadiene, and contain no sulfur, thiuram disulfide, or other additives that are capable of decomposing to yield either free sulfur or a vulcanizer accelerator. Neoprene G polychloroprene elastomers suitable for use in the invention have number average molecular weights ranging from about 20,000 to about 950,000. Neoprene W polychloroprene elastomers suitable for use in the invention have number average molecular weights ranging from about 180,000 to about 200,000. The weight percentage of chlorine in polychloroprene elastomers known under the trade designation "Neoprene" types W and G ranges from about 35 to about 37 weight percent. Other useful polychloroprene elastomers include those known under the trade designations "Baypren" (Mobay Corp.) and "Butachlor" (A. Schulman Co.).

If the organic binder is non-char-forming, a char-forming additive must be added to the compositions of the invention. Suitable non-char-forming polymers include chlorinated polyethylenes such as those known under the trade designations "Parachlor" (from Uniroyal Chemical) and "Tyrin" (from Dow Chemical); chlorosulfonated polyethylenes such as those known under the trade designation "Hypalon" (du Pont); polybutene; and polysulfide polymers.

Char-forming resins useful in the compositions of the invention include phenolic resins, polycarboimide resins, urea-aldehyde resins, and melamine-aldehyde resins. The general term "phenolic" includes phenol-formaldehyde resins as well as resins comprising other phenol-derived compounds and aldehydes.

It is frequently desirable, although not a requirement, to add a nitrogen-phosphorous compound such as those known under the trade designation "NH 1197", from Great Lakes Chemical Corp., West Lafayette Ind.; "Amgard ND" "Amgard EDAP" "Amgard NH" from Albright and Wilson, Richmond, Va.; and "Exolet IFR-10", Hoechst Celanese Corp. Somerset, N.J. When heated in combination with the other components of the composition, these materials contribute to the formation of a highly refractory char.

Vulcanizing agents and activators are crosslinking agents are added to help the elastomer cure, and accelerators help control the rate of the crosslinking reaction. Preferred crosslinking agents are those which do not contain uncombined sulfur, such as zinc oxide and magnesium oxide. One particularly useful vulcanization agent is magnesium oxide having a high surface area to volume ratio, known under the trade designation "Maglite D" from C. P. Hall, Chicago, Ill. This magnesium oxide actually acts as a vulcanization retarder when used in conjunction with zinc oxide, since the two chemicals compete for available chlorine or other halogen in the preferred chloroprene elastomer binders. Zinc oxide is a Lewis acid which serves as an activator for vulcanization.

The flexible, fire-retardant intumescent composites of the present invention can range from soft putty-like compositions to a hard rubber. This range of hardness is achieved by selectively varying amounts of the individual components of the composites.

For example, an effective amount of a plasticizer is preferably added to the inventive compositions to help make them flexible, preferably extrudable. The amount of plasticizer added ranges from about 2.5 to about 7.5 weight percent based on weight of composition. Preferred plasticizers include naphthenic oil (cycloparaffin) phosphates, such as isodecyl diphenyl phosphate, other phosphate esters, and the like. One preferred plasticizer is that known under the trade designation "Calsol" 8240, commercially available from Calumet Lubricants, Chicago, Ill. This particular plasticizer is a severely hydrogenated naphthenic oil phosphate.

The compositions of the invention may include fillers to adjust hardness and reduce cost. Fillers which may be added to the compositions of the invention include quartz sand (silica), colorants, clay, fly ash, blowing agents, perlite, vermiculite, inorganic fibers such as glass fibers and mineral wool, and organic fibers. Fillers may make the composition stiffer ("harder"). A preferred filler is alumina trihydrate, commercially available under the trade designation "Solem" SB332, from J. M. Huber, Solem Division, Norcross, Ga. Colorants are useful for product identification; preferred colorants are the various forms of iron oxide ($Fe_2O$, $Fe_3O_4$, or $Fe_2O_3$).

Conventional antioxidants and antiozonants may be used in the inventive compositions, provided they do not interfere with the beneficial effects of the stabilization agent. One useful conventional antioxidant is that known under the trade designation "Agerite Stalite S" commercially available from R. T. Vanderbilt, Norwalk, Conn., which comprises a mixture of octylated diphenylamines. A useful conventional antiozonant is a wax antiozonant commercially available from Uniroyal Chemical, Akron, Ohio under the trade designation "Sunproof Jr." This particular antiozonant is a blend of aliphatic hydrocarbons. The hydrocarbons tend to rise to the outer surface of the expanding composition and provide a barrier to ozone.

The ingredients which comprise a precursor mill base precursor of the cured intumescent compositions of the invention are typically and preferably mixed using a conventional rubber mill or Banbury processing equipment. After compounding, the precursor mill base is calendered into 0.635 cm thick sheets and laminated with aluminum foil. In another procedure, the precursor mill base is formed into 0.635 cm thick sheets on a rubber mill and then laminated in a press on one side with aluminum foil and hexagonal wire and on the other side with fifteen mil (0.038 cm) steel foil. The laminated sheets are then vulcanized in an oven at about 90° C. until the compression set of the intumescent composition reaches an acceptable level, which generally takes 5 or 6 days.

In a preferred article embodiment of the present invention, the expansion direction of the intumescent composition of the invention is effectively controlled by laminating a restraining layer thereto. Use of a restraining layer can provide assurance that the char formed during the intumescent reaction to fire and heat is generated so that the penetration cavity is optimally filled. Upon exposure to temperatures greater than about 110° C., the restrained intumescent sheet expands in a direction substantially perpendicular to the restraining layer, i.e., into the penetration, so as to optimally fill it rather than expanding isotropically as would be the case with an unrestrained intumescent sheet. Useful restraint layers are disclosed in commonly assigned U.S. Pat. No. 4,467,577 (Licht), incorporated herein by reference for its teaching as to laminated layers, and include metal foils, sheets, and screens made from aluminum, copper, steel, and lead; heavy paper and cardboard such as a Kraft-type paper; high temperature rubber and plastic sheets such as are made from silicones and epoxies, screen and cloth made from inorganic fibers such as glass fibers and high temperature organic fibers such as polyaramid.

Preferably an intumescent precursor composition of the invention is either laminated to aluminum foil on one side or to aluminum foil and hexagonal wire on one side and steel sheeting on the other. The intumescent precursor composition is cured by vulcanizing by exposure to heating means, such as a hot air oven. The vulcanization temperature must be controlled to avoid pre-expansion of the intumescent but sufficiently high to allow the elastomer to cross-link to the proper compression set. As cure increases, compression set decreases. A five or six day vulcanization at 90° C. (194° F.) is preferred in order to achieve compression sets less than 20%.

TEST METHODS

To determine compression set of an intumescent composition of the invention, 1 inch (2.54 cm) diameter discs were die cut from a sheet of a precursor composition. A MTS (Material Testing System) equipment was used to compress the samples. The initial thickness ($t_i$) of the sample was measured. The sample was compressed to ½ of its original thickness and held in compression for 30 seconds. The force was released and the sample was removed. After no less than 5 minutes and no more than 10 minutes, the final thickness ($t_f$) was measured.

The percent compression set was determined by the following equation:

% COMPRESSION SET= $(1-t_f/t_i) \times 100$

A high number for compression set indicates poor recovery of the sample's original thickness; whereas, a low number indicates good recovery. Compression set is indicative of the degree of cure. A poorly cross-linked polymer (cure is minimal) will exhibit poor recovery and high compression set. On the other hand, a well cross-linked polymer (cure is advanced) will exhibit good recovery and low compression set. The preferred compression set values are less than 20%.

To determine the expansion ratio, the die cut disc was waxed, cooled and the initial volume measured from its loss in weight in water. The disc was then placed into a preheated furnace at 350° C. for 15 minutes. The sample was removed and the volume of the expanded material (final volume) was determined by using Archimedes principle of water displacement. The expansion is represented by:

X=Final Volume/Initial Volume

High volume expansions are the most desirable. Therefore, an expansion ratio of at least 8 is preferred for this invention.

Materials Description

"Neoprene W" is the trade designation of polychloroprene, a 35–37% chlorinated elastomer, available from E. I. DuPont de Nemours, Wilmington, Del.

"Wingstay" 100 AZ is the trade designation of an antiozonant and antioxidant commercially available from Goodyear Chemical Co., Akron, Ohio, and is a mixture of diaryl para-phenylenediamines having a melting point ranging from about 108° to 114° C.;

"Wingstay" 29 is the trade designation of an antiozonant commercially available from Goodyear Chemical Co., Akron, Ohio, and is a styrenated diphenylamine liquid adsorbed on fumed silica so that the fumed silica is 30% by weight;

"BriteSil HS-240" is the trade designation of a hydrated sodium silicate, commercially available from Philadelphia Quartz Co., Valley Forge, Pa.;

"Solem" SB332 is the trade designation of alumina trihydrate, commercially available from J. M. Huber, Solem Division, Norcross, Ga.;

"Agerite Stalite S" is the trade designation for an antioxidant commercially available from R. T. Vanderbilt, Norwalk, Conn., which comprises a mixture of octylated diphenylamines;

"Sunproof Jr." is the trade designation for an antiozonant comprising a waxy blend of aliphatic hydrocarbons, commercially available from Uniroyal Chemical, Akron, Ohio;

"Maglite D" is the trade designation for a vulcanization agent comprised of magnesium oxide having a high surface area to volume ratio, commercially available from C. P. Hall, Chicago, Ill.; and "Mag Beads" is the trade designation of a vulcanizing agent comprised of a dispersion of magnesium oxide in a hydrogenated cycloparaffin oil, commercially available from Elastochem, Chardon, Ohio.

"Iron Oxide PF-95" is the trade designation for iron oxide commercially available from Bailey Engineers, Fairfield, Ala.

"Calsol" 8240 is the trade designation for a plasticizer commercially available from Calumet Lubricants, Chicago, Ill., and is a severly hydrogenated cycloparaffinic oil;

"Elastozinc" is the trade designation for a vulcanizing agent, comprised of a dispersion of zinc oxide in a hydrogenated cycloparaffinic oil, commercially available from Elastochem, Chardon, Ohio.

"DOTG" is the trade designation of an accelerator, diorthotolylguanidine, commercially available from American Cyanamid, Charlotte, N.C.

"Unads" is the trade designation of a dimethylthiuram monosulfide accelerator, commercially available from Akzo Chemicals, Akron, Ohio.

"PB-RM-S-80" is a trade designation for a sulfur dispersion in an ethylene copolymer binder, from Elastochem, Chardon, Ohio.

Microfine wettable sulfur is a product of George Gulf Sulfur, Valdosta, Ga.

In the following Examples, all parts and percentages are by weight unless otherwise specified.

EXAMPLES

Examples 1–13 and Comparative Examples A–E

The expansion and compression set properties of compositions of Examples 1–13 (inventive) were compared with the compositions of Comparative Examples A–E (the compositions are presented in Tables 1–3). The compositions were compounded in a laboratory utilizing a miniature mixer of 350 mL capacity with cam mixing blades. The mixer was powered by a torque rheometer known as "Plasticorder" Model DR-2071, commercially available from C. W. Brabender Instruments, Inc., South Hackensack, N.J. It is referred to as the "Brabender" mixer.

The mixing and sample preparation procedure were as follows:

1. The elastomer was added to the mixer and mixed for five minutes.
2. With the exception of hydrated sodium silicate, the remaining ingredients were added and mixed within the next 15 minutes.
3. The hydrated sodium silicate was added and the composition mixed for 5 minutes.
4. The material was removed from the mixer and pressed into 0.25 inch (0.635 cm) thick sheet with 0.002 inch (0.127 mm) thick aluminum foil laminated on one side. A Wabash press, Model 7S-1818-2TM, at 60° C. (140° F.), was used to press and laminate the material.
5. The aluminum foil laminated sheet was then placed for 35 days in an oven heated to 90° C. (194° F.).
6. Samples were taken periodically during the 35 days by die cutting 1 inch (2.54 cm) diameter discs from the sheet.
7. Compression set and expansion ratio were determined on the compositions of Examples 1–13 and Comparative Examples A–E. The data presented in Tables 4–6 provided an assessment of the advancement of the crosslinking of the elastomer and of the accelerated aging characteristics of the compositions (compression set and expansion ratio). It can be seen by comparing the inventive compositions (those containing the stabilizing agent known under the trade designation "Wingstay" 100 AZ)

with the comparative compositions (those not containing "Wingstay" 100 AZ) that excellent expansion and compression sets were obtained.

TABLE 1

COMPOSITIONS
VARIOUS CONCENTRATIONS OF SULFUR IN
INTUMESCENT FIRESTOP COMPOSITIONS

| INGREDIENTS | SAMPLE DESIGNATION | | | | |
|---|---|---|---|---|---|
| | EX. 1 | EX. 2 | EX. 3 | EX. 4 | EX. 5 |
| Neoprene W | PHR* 100 | PHR 100 | PHR 100 | PHR 100 | PHR 100 |
| Wingstay 29 | 1.00 | 1.00 | 1.00 | 1.00 | 1.00 |
| Wingstay 100AZ | 3.00 | 3.00 | 3.00 | 3.00 | 3.00 |
| Maglite D | 4.00 | 4.00 | 4.00 | 4.00 | 4.00 |
| Alumina Trihydrate | 32.1 | 32.1 | 32.1 | 32.1 | 32.1 |
| Iron Oxide PF-95 | 5.00 | 5.00 | 5.00 | 5.00 | 5.00 |
| Calsol 8240 | 21.7 | 21.7 | 21.7 | 21.7 | 21.7 |
| Elastozinc | 5.68 | 5.68 | 5.68 | 5.68 | 5.68 |
| Sulfur | | 2.00 | 4.00 | 1.00 | 0.50 |
| Brit Sil HS-240 | 230 | 230 | 230 | 230 | 230 |

*PHR = parts per hundred parts elastomer

TABLE 2

INTUMESCENT FIRESTOP COMPOSITIONS

| INGREDIENTS | SAMPLE DESIGNATION | | | | | | |
|---|---|---|---|---|---|---|---|
| | EX. 6 | EX. 7 | EX. 8 | EX. 9 | A | B | C |
| Neoprene W | PHR 100 | PHR 100 | PHR 100 | PHR 100 | PHR 100 | PHR 100 | PHR 100 |
| Agerite S.S. | — | — | — | — | 2.06 | 2.06 | 2.00 |
| Wingstay 29 | 1.00 | 1.00 | 1.00 | 1.00 | — | — | — |
| Wingstay 100AZ | 3.00 | 3.00 | 3.00 | 3.00 | — | — | — |
| Maglite D | 4.00 | — | 4.00 | — | 4.00 | 4.00 | 4.00 |
| Mag Beads (MgO) | — | 6.15[1] | — | 6.15[1] | — | — | — |
| Alumina Trihydrate | 32.1 | 32.1 | 32.1 | 32.1 | 32.1 | 32.1 | 32.1 |
| Iron Oxide PF-95 | 5.00 | 5.00 | 5.00 | 5.00 | 5.00 | 5.00 | 5.00 |
| Calsol 8240 | 21.7 | 19.62 | 21.7 | 19.62 | 21.7 | 21.7 | 21.7 |
| Elastozinc | 5.68 | 5.68 | 5.68 | 5.68 | 5.68 | 5.68 | 5.68 |
| Sulfur | .25 | — | — | — | 1.00 | — | — |
| PB (RM-S)-80 | — | 1.25[3] | — | 1.25[3] | — | — | — |
| DOTG | 1.50 | — | 1.50 | 1.50 | — | — | — |
| Unads | 1.00 | — | 1.00 | 1.00 | — | — | — |
| Sunproof Jr. | — | — | — | — | — | — | 3.00 |
| Brit Sil HS-240 | 230 | 230 | 230 | 230 | 230 | 230 | 230 |

[1] dispersion of MgO in hydrogenated oil equivalent to 4.00 PHR MgO
[2] compensated for the amount of oil in Mag Beads
[3] dispersion of sulfur in an ethylene copolymer binder equivalent to 1.00 PHR sulfur

TABLE 3

INTUMESCENT FIRESTOP COMPOSITIONS

| INGREDIENTS | SAMPLE DESIGNATION | | | | | |
|---|---|---|---|---|---|---|
| | EX. 10 | EX. 11 | D | E | EX. 12 | EX. 13 |
| Neoprene W | PHR 100 | PHR 100 | PHR 100 | PHR 100 | PHR 100 | PHR 100 |
| Agerite S.S | 2.00 | 2.00 | 2.00 | 2.00 | 2.00 | 2.00 |
| Wingstay 29 | — | — | — | — | — | — |
| Wingstay 100AZ | 2.00 | 2.00 | — | — | 2.00 | 2.00 |
| Maglite D | 4.00 | 4.00 | 4.00 | 4.00 | 4.00 | 4.00 |
| Mag Beads (MgO) | — | — | — | — | — | — |
| Alumina Trihydrate | 32.1 | 32.1 | 32.1 | 32.1 | 32.1 | 32.1 |
| Iron Oxide PF-95 | 5.00 | 5.00 | 5.00 | 5.00 | 5.00 | 5.00 |
| Calsol 8240 | 21.7 | 21.7 | 21.7 | 21.7 | 21.7 | 21.7 |
| Elastozinc | 5.68 | 5.68 | 5.68 | 5.68 | 5.68 | 5.68 |
| Sulfur | .25 | — | — | .25 | .25 | — |
| PB (RM-S)-80 | — | — | — | — | — | — |
| DOTG | 1.50 | 1.50 | 1.50 | 1.50 | 1.50 | 1.50 |
| Unads | 1.00 | 1.00 | 1.00 | 1.00 | 1.00 | 1.00 |
| Sunproof Jr. | — | — | — | — | 3.00 | 3.00 |

TABLE 3-continued

INTUMESCENT FIRESTOP COMPOSITIONS

| INGREDIENTS | SAMPLE DESIGNATION | | | | | |
|---|---|---|---|---|---|---|
| | EX. 10 | EX. 11 | D | E | EX. 12 | EX. 13 |
| Brit Sil HS-240 | 230 | 230 | 230 | 230 | 230 | 230 |

TABLE 4

EXPANSION RATIOS (X) AND COMPRESSION SETS (CS) OF SAMPLES AGED AT 90° C.

| DAYS AGES AT 90° C. | SAMPLE DESIGNATION, X/CS | | | | |
|---|---|---|---|---|---|
| | EX. 1 | EX. 2 | EX. 3 | EX. 4 | EX. 5 |
| 1 | 12.8/30.9 | 14.7/17.9 | 15.5/17.1 | 12.9/27.3 | 13.6/31.0 |
| 2 | 18.2/16.0 | 10.9/7.91 | 9.62/5.19 | 5.26/11.1 | 11.9/16.4 |
| 3 | 16.8/15.9 | 7.62/4.40 | 6.52/3.79 | 10.5/7.79 | 14.6/9.84 |
| 5 | 11.3/6.46 | 5.96/4.15 | 5.62/4.96 | 9.22/4.55 | 9.55/5.15 |
| 7 | 9.45/4.31 | 5.04/3.53 | 4.99/4.52 | 6.27/2.49 | 7.94/3.89 |
| 14 | 6.54/5.39 | 4.12/8.97 | 4.46/6.72 | 5.34/4.25 | 6.21/2.89 |
| 21 | 6.12/6.08 | 4.59/2.86 | 3.99/6.37 | 5.35/1.26 | 5.77/3.29 |
| 35 | 5.77/5.13 | 4.51/3.93 | 3.88/4.96 | 5.41/1.79 | 5.84/3.33 |

TABLE 5

EXPANSION RATIOS (X) AND COMPRESSION SETS (CS) OF SAMPLES AGED AT 90° C.

| DAYS AGED AT 90° C. | SAMPLE DESIGNATION, X/CS | | | | | | |
|---|---|---|---|---|---|---|---|
| | EX. 6 | EX. 7 | EX. 8 | EX. 9 | A | B | C |
| 1 | 11.8/26.8 | 12.7/22.0 | 12.8/32.5 | 13.3/9.65 | 4.49/42.3 | 6.98/32.6 | 5.64/21.8 |
| 2 | 17.2/14.1 | 11.5/9.51 | 14.7/20.7 | 5.11/10.6 | 8.88/28.8 | 7.54/38.9 | 7.61/21.0 |
| 3 | 10.5/11.7 | 8.22/6.53 | 13.2/16.4 | 4.99/5.33 | 11.3/28.3 | 8.12/37.8 | 10.4/22.5 |
| 5 | 8.22/10.2 | 6.07/4.55 | 10.8/11.3 | 4.86/5.71 | 13.7/27.6 | 9.17/29.4 | 11.6/25.4 |
| 7 | 9.33/8.53 | 5.61/5.46 | 9.81/8.71 | 4.95/3.93 | 13.9/20.6 | 9.70/31.9 | 13.0/23.1 |
| 14 | 9.38/8.12 | 5.00/3.68 | 9.04/7.69 | 5.09/3.57 | 12.9/9.33 | 13.0/23.9 | 14.3/17.2 |
| 21 | 8.59/7.13 | 4.93/1.32 | 8.31/6.54 | 5.38/4.78 | 10.7/9.40 | 13.2/22.7 | 13.5/15.0 |
| 35 | 8.46/4.91 | 4.91/1.47 | 7.90/4.76 | 5.40/3.22 | 9.45/8.75 | 12.7/17.2 | 12.4/10.1 |

TABLE 6

EXPANSION RATIOS (X) AND COMPRESSION SETS (CS) OF SAMPLES AGED AT 90° C.

| DAYS AGED AT 90° C. | SAMPLE DESIGNATION, X/CS | | | | | |
|---|---|---|---|---|---|---|
| | EX. 10 | EX. 11 | D | E | EX. 12 | EX. 13 |
| 1 | 8.67/33.6 | 6.91/35.3 | 5.82/39.7 | 6.86/35.1 | 11.3/31.4 | 8.42/33.4 |
| 2 | 13.2/28.0 | 14.8/31.8 | 7.40/37.6 | 10.7/29.6 | 18.0/22.5 | 14.3/24.8 |
| 3 | 13.8/17.4 | 15.7/24.4 | 10.2/34.0 | 11.5/22.6 | 13.4/18.6 | 16.2/20.9 |
| 5 | 13.4/14.8 | 16.2/16.4 | 15.3/29.2 | 13.5/18.9 | 13.3/12.6 | 15.3/12.6 |
| 7 | 12.7/16.8 | 14.4/14.3 | 16.2/27.2 | 13.1/19.2 | 14.1/9.91 | 13.4/9.54 |
| 14 | 12.9/10.8 | 13.8/9.67 | 14.3/16.1 | 13.8/17.1 | 12.6/7.83 | 11.8/7.48 |
| 21 | 13.2/9.21 | 12.3/10.6 | 13.9/15.8 | 14.2/15.1 | 11.7/7.42 | 11.1/7.14 |
| 35 | 11.3/7.60 | 11.1/7.05 | 11.6/9.95 | 11.9/12.8 | 10.2/3.71 | 9.90/4.71 |

The composition of Example 13 was also compared with a composition of similar nature except using previously known and conventional ingredients, as detailed in Table 7. The expansion ratio and compression set data are given in Table 8.

TABLE 7

COMPARISON OF FS-195 (PRESENT PRODUCT) AND Example 13 COMPOSITIONS

| Composition | Function | FS-195 Product PHR | FS-195 Product % | Ex. 13 PHR | Ex. 13 % |
|---|---|---|---|---|---|
| Neoprene W* | binder | 100 | 23.0 | 100 | 24.5 |
| Acerite S.S.* | antioxidant | 2.06 | 0.474 | 2.00 | 0.490 |
| Wingstay 100AZ** | antiozonant | — | — | 2.00 | 0.490 |
| Sunproof Jr.** | Antiozonant | — | — | 3.00 | 0.735 |
| Maglite D** | vulcanizer | — | — | 4.00 | 0.980 |
| Alumina Trihydrate** | filler | — | — | 32.1 | 7.87 |
| Iron Oxide PF-95** | colorant | — | — | 5.00 | 1.23 |
| Min-U-Sil-10 Micron*** | filler | 32.0 | 7.37 | — | — |
| BTL 29-407 (Phenolic resin)*** | char former | 23.8 | 5.48 | — | — |
| Calsol 8240** | plasticizer | — | — | 21.7 | 5.32 |
| DOP (dioctyl phthalate)*** | plasticizer | 35.6 | 8.20 | — | — |
| Elastozinc** | vulcanizer | — | — | 5.68 | 1.39 |
| DOTG** | accelerator | — | — | 1.50 | 0.368 |
| Sulfur*** | vulcanizer | 0.456 | 0.105 | — | — |
| Red Lead*** | vulcanizer | 5.17 | 1.19 | — | — |
| UNADS (TMTM)* | accelerator | 5.17 | 1.19 | 1.00 | 0.245 |
| BRIT Sil HS-240* | intumescent | 230 | 53.0 | 230 | 56.4 |

*used in both the present product known under the trade designation "FS-195", from 3M, and a composition within the invention (Example 13)
**used only in the Example 13
***used only in the "FS-195" product

TABLE 8

EXPANSION RATIOS (X) AND COMPRESSION SETS (CS) OF SAMPLES AGED AT 90° C. FOR FS-195 (PRESENT PRODUCT) AND EXAMPLE 13 SAMPLE DESIGNATION, X/CS

| DAYS AGED AT 90° C. | PRESENT FS-195 PRODUCT | EX. 13 |
|---|---|---|
| 0 (not cured) | 3.20/46.0 | — |
| 1 | — | 8.42/33.4 |
| 2 | — | 14.3/24.8 |
| 3 | — | 16.2/20.9 |
| 5 | — | 15.3/12.6 |
| 7 | 14.2/25.8 | 13.4/9.54 |
| 8 | 14.4/17.3 | — |
| 9 | 13.7/21.4 | — |
| 10 | 14.5/22.3 | — |
| 14 | 11.6/19.9 | 11.8/7.48 |
| 21 | 10.2/17.4 | 11.1/7.14 |
| 35 | 7.28/14.0 | 9.90/4.71 |

Examples 14–16

Wrap/Strips and Composite Sheets

For preparation of the fire retardant compositions of these examples, a water cooled F-80 Banbury mixer was used. All ingredients except the elastomer, plasticizer, and intumescent were prebatched by dry blending. The elastomer prebatch, plasticizer and intumescent were charged into the Banbury mixer at low speed. The ram was lowered and a ram pressure of 50 psi was maintained. When the temperature reached 82° C. (180° F.), the batch was dropped, extruded, and calendered into 0,635 cm (0.25 inch) sheets which were laminated on one side with aluminum foil for Examples 14 and 15. The sheets were cured in an oven at 90° C. for 5 to 6 days.

For producing the laminates of Example 16, the extruded material from the Banbury mixer was placed on a 2 roll rubber mill, milled to 0,635 cm (0.25 inch) thickness, cut to size, and laminated on one side with 0,015 inch (0.38 mm) thick galvanized stainless hexagonal wire screen and on the other side with 0.0025 inch (0.00635 cm) aluminum foil.

The laminate of Example 14 employed the flexible fire-retardant intumescent composition as indicated in Table 7 as Example 13 laminated to an aluminum foil. This laminate was evaluated in restricting collars and plastic pipe devices according to ASTM Test Method E 814. These laminates were installed around 10.2 cm diameter polyvinyl chloride pipes. In comparison, a laminate comprising compositions similar to the composition of Table 7, denoted as "Present FS-195 Product," was laminated to aluminum and tested in the restricting collars and plastic pipe devices according to the ASTM Test Method. Compared to the comparative product, the inventive laminate surpassed flame-through time by about one hour. That is, the mean flame-through time for the laminate of Example 14 containing the composition within the invention was approximately three and one half hours, whereas the mean flame-through time for the comparative product assembly was approximately two and one half hours.

For Example 15, the composition of Example 13 was applied to an aluminum foil backing as described above for Example 14. The laminate of Example 15 was tested for two hour flame-through, one hour temperature, and one hour backup hose stream tests according to the above mentioned ASTM Test Method E 814. The laminate of Example 15 was wrapped around a 20 inch (50.8 cm) diameter steel pipe placed in a 29 inch (73.7 cm) diameter opening of a 2.5 inch (6.35 cm) concrete slab. Four wraps of the laminate were used on steel pipe which was insulated with 3 inches (7.62 cm) of glass fiber insulation. The two hour flame-through, one hour temperature, and one hour backup hose stream tests were passed by the laminate within the invention.

In Example 16, the flexible intumescent fire-retardant composition of Example 13 was laminated between aluminum foil and galvanized hexagonal stainless steel wire screen as above described, and was installed on one half of a 32 inch (81.3 cm) square opening in a 4.5 inch (11.4 cm) concrete slab. A comparative product laminate using the composition of Table 7 indicated as "FS-195" laminated between aluminum foil and galvanized hexagonal stainless steel wire screen was installed on the other half of the square opening. In each half a 4 inch (11.4 cm) diameter copper pipe was installed. The installation followed the requirements and is equivalent to Underwriters Laboratories' System 93 for the bottom application. The laminate within the invention passed the one hour flame-through test and the hose stream test.

Various modifications and alterations of the invention will become apparent to those skilled in the art. The above disclosure and examples are not intended to limit the scope of the intended claims but are merely illustrative thereof.

What is claimed is:

1. A flexible, fire-retardant, intumescent composition comprising:
   a) an intumescent material;
   b) an effective amount of a stabilizing agent; and
   c) an organic binder throughout which the intumescent material and stabilizing agent are dispersed, the binder being at least partially crosslinked, wherein the stabilizing agent consists essentially of one or more compounds selected from the group consisting of compounds within general formula I

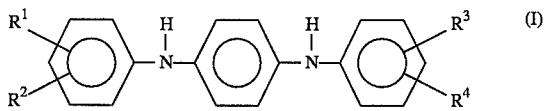

wherein $R^1$–$R^4$ inclusive are independently selected from the group consisting of hydrogen and alkyl groups having from 1 to about 5 carbon atoms, with the provisos that:
   i) either both of $R^1$ and $R^2$, or both $R^3$ and $R^4$ are alkyl groups having from 1 to about 5 carbon atoms;
   ii) the stabilizing agent has a melting point ranging from about 105° C. to about 125° C.;
   iii) the composition comprises less than 1 PHR uncombined sulfur; and
   iv) the composition has a compression set less than 20%, said compression set being dependent on the presence of said stabilizer.

2. Composition in accordance with claim 1 wherein said stabilizing agent is a mixture of compounds within general formula I and has a melting point ranging from about 108° C. to about 114° C.

3. Composition in accordance with claim 1 wherein said organic binder is elastomeric.

4. Composition in accordance with claim 3 wherein said elastomeric organic binder is at least partially halogenated.

5. Composition in accordance with claim 1 wherein said organic binder is a non-charring organic binder, and wherein the composition further comprises a char-forming material.

6. Composition in accordance with claim 5 wherein said char-forming material comprises a material selected from the groups consisting of phenolic resins, polycarboimide resins, urea-aldehyde resins, melamine aldehyde resins, and nitrogen-phosphorous compounds.

7. Composition in accordance with claim 1 wherein said intumescent material is present in an amount sufficient to provide an expansion of the composite on exposure to heat of at least about 8 times an original volume of composition.

8. Composition in accordance with claim 2 which is substantially free of uncombined sulfur.

9. Composition in accordance with claim 2 which further includes a curing accelerator containing sulfur linkages but free from uncombined sulfur.

10. Composition in accordance with claim 9 wherein said curing accelerator is dimethylthiuram monosulfide.

11. Composition in accordance with claim 1 wherein the intumescent material is a hydrated alkali metal silicate.

12. An article comprising the composition in accordance with claim 1 in the form of a sheet having a first side and a second side, said first side laminated to a metal foil.

13. Article in accordance with claim 12 wherein said metal foil is selected from the group consisting of aluminum foil and stainless steel foil.

14. An article in accordance with claim 12 wherein the second side of the sheet is laminated to a galvanized stainless steel wire screen.

15. A flexible, fire-retardant, intumescent composition comprising:
   a) an intumescent material;
   b) an effective amount of a stabilizing agent; and
   c) an elastomeric organic binder throughout which the intumescent material and stabilizing agent are dispersed, the elastomeric binder being at least partially crosslinked, wherein the stabilizing agent consists essentially of one or more compounds selected from the group consisting of compounds within general formula I

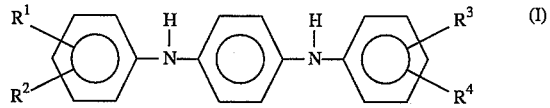

wherein $R^1$–$R^4$ inclusive are independently selected from the group consisting of hydrogen and methyl groups, with the provisos that:
   i) either both of $R^1$ and $R^2$, or both $R^3$ and $R^4$ are methyl groups;
   ii) the stabilizing agent has a melting point ranging from about 108° C. to about 114° C.;
   iii) the composition comprises less than 1 PHR uncombined sulfur; and
   iv) the composition has a compression set less than 20%, said compression set being dependent on the presence of said stabilizer.

16. A method of fire stopping a through-penetration, the method comprising applying the composition of claim 1 to a through-penetration and allowing the composition to expand and char upon application of heat.

17. A method of fire stopping a through-penetration, the method comprising applying the article of claim 12 to a through-penetration and allowing the composition to expand and char upon application of heat.

18. A method of increasing the useful life of a flexible, fire-retardant, intumescent composition comprised of an organic binder which is at least partially crosslinked, an intumescent material, and various optional ingredients, the method comprising formulating the composition with an effective amount of a stabilizing agent consisting essentially of one or more compounds selected from the group consisting of compounds within general formula I

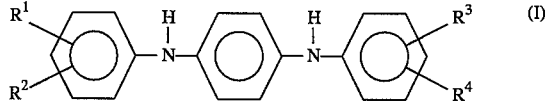

wherein $R^1$–$R^4$ inclusive are independently selected from the group consisting of hydrogen and alkyl groups having from 1 to about 5 carbon atoms, with the provisos that:
   i) either both of $R^1$ and $R^2$, or both $R^3$ and $R^4$ are alkyl groups having from 1 to about 5 carbon atoms;
   ii) the stabilizing agent has a melting point ranging from about 105° C. to about 125° C.;

iii) the composition comprises less than 1 PHR uncombined sulfur; and iv) the composition has a compression set less than 20%, said compression set being dependent on the presence of said stabilizer.

19. Method in accordance with claim 18 wherein the stabilizing agent has a melting point ranging from about 108° to about 114° C.

* * * * *